(12) United States Patent
Alvarado

(10) Patent No.: US 7,671,749 B2
(45) Date of Patent: Mar. 2, 2010

(54) SYSTEM AND METHOD FOR STARTLING ANIMALS

(76) Inventor: Donald T. Alvarado, 6318 E. Winchcomb Dr., Scottsdale, AZ (US) 85254

( * ) Notice: Subject to any disclaimer, the term of this patent is extended or adjusted under 35 U.S.C. 154(b) by 235 days.

(21) Appl. No.: 11/863,454

(22) Filed: Sep. 28, 2007

(65) Prior Publication Data
US 2008/0210153 A1 Sep. 4, 2008

Related U.S. Application Data

(60) Provisional application No. 60/827,370, filed on Sep. 28, 2006.

(51) Int. Cl.
G08B 23/00 (2006.01)
(52) U.S. Cl. .............. 340/573.2; 340/573.1; 340/573.3; 43/2; 116/22 A
(58) Field of Classification Search .............. 340/573.2, 340/573.1, 573.3, 384.2; 43/2; 116/22 A
See application file for complete search history.

(56) References Cited

U.S. PATENT DOCUMENTS 5,274,942 A * 1/1994 Lanius ........................... 43/2
5,289,654 A * 3/1994 Denny et al. ................... 43/2
6,445,298 B1 * 9/2002 Shepher .................... 340/573.1
7,246,569 B2 * 7/2007 Grandy et al. ............ 116/22 A
7,268,689 B2 * 9/2007 Sulaver ..................... 340/573.1
7,411,504 B2 * 8/2008 Hanscom .................. 340/572.3

OTHER PUBLICATIONS http://www.birdbgone.com/ (2 pgs.), 2005.
http://www.birdbusters.com/(2 pgs.), 2001.
http://www.thepigeonguy.com/ (3 pgs.), 2001.

* cited by examiner

Primary Examiner—Davetta W Goins
(74) Attorney, Agent, or Firm—Snell & Wilmer L.L.P.

(57) ABSTRACT

A device is disclosed which is configured to startle certain pests which may cause a variety of problems in certain areas of a home or workplace. By limiting the action of the pests, or removing the pests from the area, the invention may prevent the destruction of property, minimize animal droppings, and minimize the spread of disease. The invention includes an external shell in the shape of any desired animal, wherein the external shell also covers internal mechanical, electronic and electrical components. The components are configured to move parts of the animal shell and move other items attached to the shell. The movement may be a result of a motion detector detecting an undesirable pest, programmable timer, a remote control device operated within the safety of a home or by other sensors.

14 Claims, 15 Drawing Sheets

SYSTEM AND METHOD FOR STARTLING ANIMALS

CROSS-REFERENCE TO RELATED APPLICATIONS

This application claims priority to, and the benefit of, U.S. Provisional Application Ser. No. 60/827,370, filed Sep. 28, 2006 and entitled "System and Method for Startling Animals", which is hereby incorporated by reference in its entirety.

FIELD OF INVENTION

The invention generally relates to a system and method for startling birds, small animals and people, and more particularly, to a life-like movable figure for dispersing birds and small animals which may destroy important areas.

BACKGROUND OF THE INVENTION

Pigeons, wild birds, snakes, mice, gophers and other pests may cause a variety of problems in certain areas of a home or workplace. These pests may, for example, destroy property, leave droppings, scare away other animals, harm humans, eat plants and attract other animals. Various devices, traps, poisons, smells and techniques have been developed to reduce such pests in certain areas. For example, owners may spray toxic chemicals, lay down poisonous pellets, set sharp traps, deposit chemicals with putrid odors and try to hunt down the pests. However, many of these items are dangerous to the environment, likely to be touched or eaten by children, damaging to clothes and plants, and are otherwise ineffective.

Others have tried to analyze the ecosystem related to the particular pest to determine the predator/prey combination. After determining the relevant predator, they typically purchase a stationary imitation of the relevant predator and place it in the area in an effort to scare away the pest. However, many of the predator figures are not life-like in appearance, and the figures do not move. As such, the pests may not see the figure, or the pests may eventually ignore the figure as a non-threat. Accordingly, a strong need exists for a figure which is more life-like with motion-activated moving parts such that it is more likely to scare certain pests.

SUMMARY OF THE INVENTION

The invention improves upon the shortcomings of prior art systems by providing a device which is configured to startle any type of pest which may cause a variety of problems in certain areas of a home or workplace. By limiting the action of the pests, or removing the pests from the area, the invention may prevent the destruction of property, minimize animal droppings, and minimize the spread of disease. The invention may also be configured to scare or entertain humans. The invention includes an external shell in the shape of any desired animal. The external shell covers internal mechanical, electronic and electrical components. The components are configured to move parts of the animal shell and/or move other items attached to the shell. The movement may be a result of a motion detector detecting an undesirable pest, a remote control device operated within the safety of a home, or by other sensors.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

Figure 1:
FIG. 1 shows a perspective view of the shell with wings spread, in accordance with an exemplary embodiment of the present invention.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. Moreover, any of the functions or steps may be outsourced to, or performed by, one or more third parties. Furthermore, any reference to singular includes plural embodiments, and any reference to more than one component may include a singular embodiment.

In general, the invention includes any hardware and/or software suitably configured to startle, scare or gain the attention of pests. Pests may include, for example, pigeons, birds, snakes, mice, bats, rabbits, rodents, gophers and other pests which may cause a variety of problems in certain areas of a home or workplace. By limiting the action of the pests, or removing the pests from the area, the invention may, for example, prevent the destruction of property, yards, parks and common areas, minimize animal droppings, minimize the spread of disease, avoid other desired animals being scared away, avoid harm to humans, avoid plant destruction and minimize other animals being attracted to the areas to prey on the pests. The invention may also be configured to scare or entertain any other animals or humans. The invention may be supplemented with decorations for any occasion. For example, Halloween decorations may be incorporated into the invention such that the invention may entertain kids during the holiday. In one embodiment, the invention is mounted in a yard, roof, wall, or other similar locations. In one embodiment,- the invention is mounted at a height of 5' or higher. The invention is also configured for flat surface mounting.

The components and/or movements of the invention may be operated by, or controlled by, any technology known in the art. For example, electronics, computers, optics, solar, battery, AC current, DC current, mechanical devices, radio frequency, infra-red, pressure devices, remote devices, wired devices, contactless devices, timers, motion sensors, light sensors, environmental sensors (e.g., rain, heat, etc) and/or the like. In one embodiment, the user communicates with the invention using a computer webpage accessible via the internet. For example, the user may enter into the webpage instructions for the timer, sensitivity for the motion detector, the type of moving parts or signals that should activate at certain times, and any other instructions which control any other aspect of the invention. The webpage will then use the entered data to create a signal packet to send (via wire or wireless communication) to a control module within the shell of the invention. The control module may be configured to be programmable by such signal packet such that the control module controls various aspects of the components of the invention. The system may also notify the user (or any third party) upon any event such as, for example, the detection of a pest, or after a certain number of pests have been detected. As used herein, "upon" may include immediate, within a few seconds, within a few minutes, within a predetermined time, for any desired duration and/or any other period.

In an exemplary embodiment, one or more of the components of the invention are manually operated, motion-activated, remote-controlled, timer controlled, random start and stop, programmable, activated based on any sensor (e.g., moisture in the air, heat level, barometric pressure, certain level of wind, etc) and/or the like. For example, with respect to motion activation, when a pest comes within a certain distance of the device, certain components of the invention may begin to start, increase, decrease, random, periodic or any other type of motion. The motion may include swirling, flashing eyes, wings flapping, movement from the wind, and/or any other movement configured to frighten the birds away. The device may also include streamers that fly about and distract the birds. In an exemplary embodiment, the invention includes audio, video and/or any other signal or media, or send out an item or chemical. For example, predator noises, popping noises, human noises, gunshot noises, lightening noises, display of holograms, display of a video on a nearby surface, laser light pointer, mist spray, pesticide spray, disperse pest poison, spray a stream of water (e.g., toward the animal), create bubbles, and/or the like. The invention may also be integrated with other home or work systems. For example, when detecting an animal, the invention may activate the lawn sprinklers, turn on spot lights, activate a horn, turn on lights inside the house, turn on a speaker which plays a radio or television and/or the like.

In an exemplary embodiment, the invention is partially or fully environmentally safe. For example, it may contain minimal or no toxins and may not inflict physical harm upon the pests.

Figure 2:
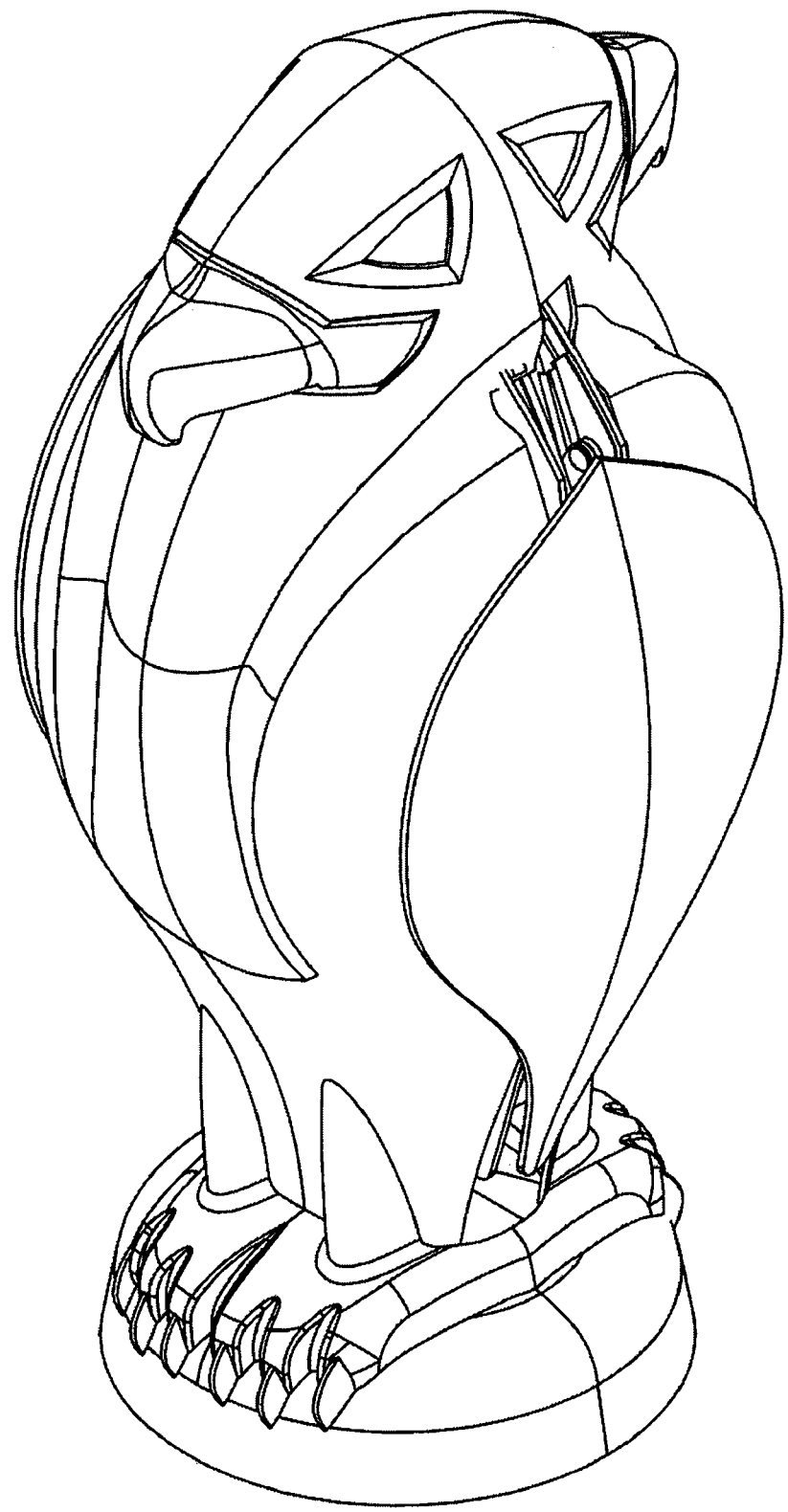
FIG. 2 shows a perspective view of the shell with wings fully retracted, in accordance with an exemplary embodiment of the present invention.
Figure 3:
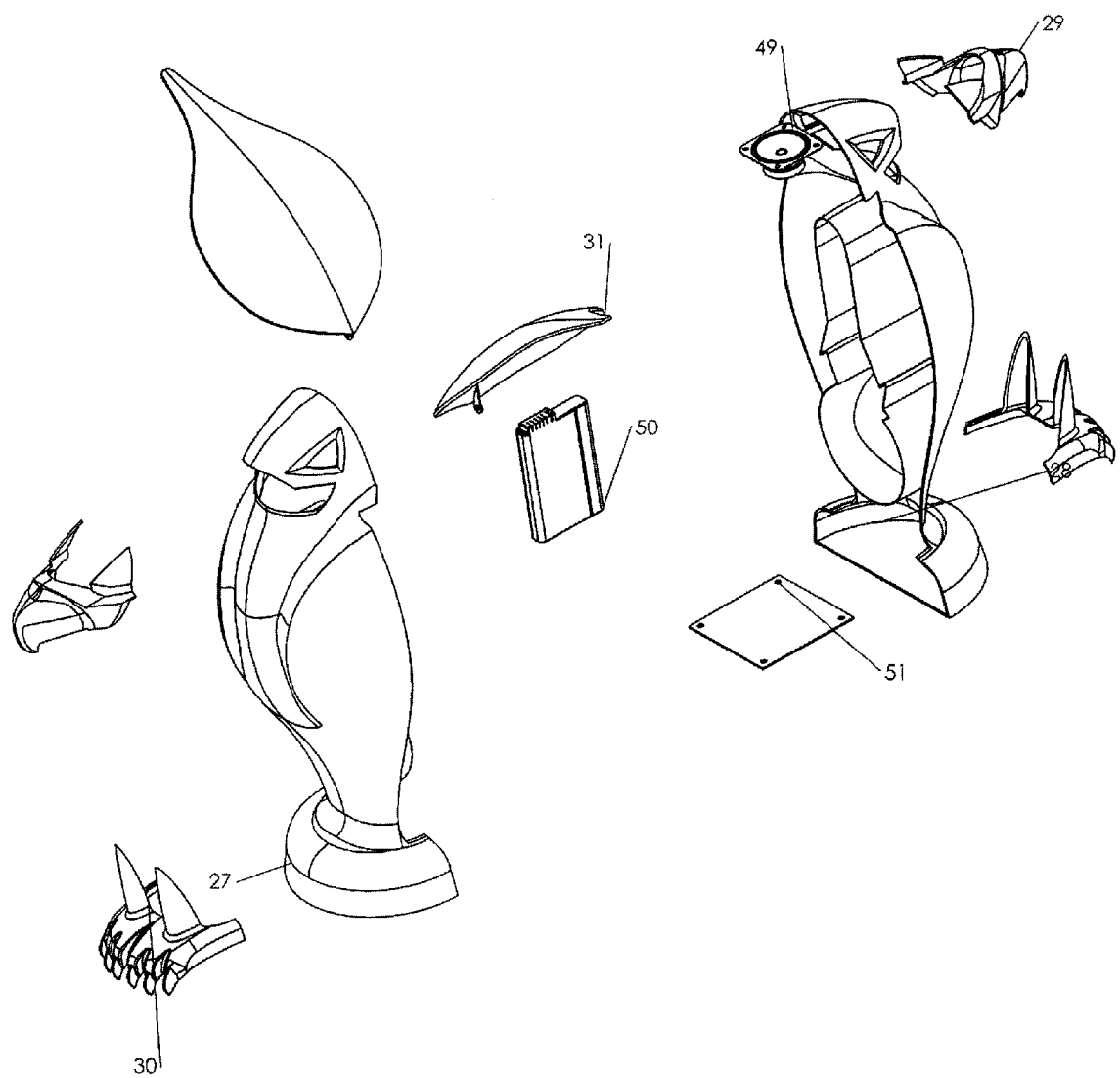
FIG. 3 shows an exploded view of the external shell components, in accordance with an exemplary embodiment of the present invention.

More specifically, in one embodiment, and with respect to FIGS. 1-3, the invention includes a shell in the shape of any desired animal. The shell may completely or partially contain the mechanical, electronic and electrical components. The shell may be in the form of an owl, bird, cat, dog, squirrel, or any other animal. The shell may also be in the form of a human, cartoon character, mythical character, movie star, symbol, shape, architectural structure, statute, natural landscape and/or the like. The shell may be comprised of any material such as, for example, plastic, clay, metal, wood, clear, painted and/or the like. The shell may be injection molded as one unit, or may be comprised of any number of components that are suitably connected, either permanently or removably connected. In one embodiment, with respect to FIGS. 1-3, the shell includes a hawk shape, a wing, a beak and claws on both the front and back sides.

In one embodiment, with respect to FIG. 3, the shell is comprised of two sections including a top and bottom plate of the unit. The shell may provide storage or placement of the internal components in either half or both halves. The storage may include space for any desired item such as, for example, pest poison food, water, pesticides, bubble solution and/or the like. In one embodiment, the two portions of the shell creates a gap for the motion of a center spindle to take place. With respect to FIG. 1, the center movement, wing movement or body movement may include either up, down, back and forth, full circular rotation, side to side, random, increasing, decreasing, periodic and/or the like. The streamers, wings, body, eyes, laser scanner or similar types of devices to deter a pest may be attached to a motor or the center spindle, or to any other of the electronic or mechanical parts of the invention.

The top or bottom plate of the shell may be configured to hold the circuit, hold batteries, seal the bottom of the top half to the shell, serves as a platform to extend the control of activation of the Motion Detector from outside of invention, and allows other devices, components, circuits, wires, and batteries to be stored in this area.

Figure 4:
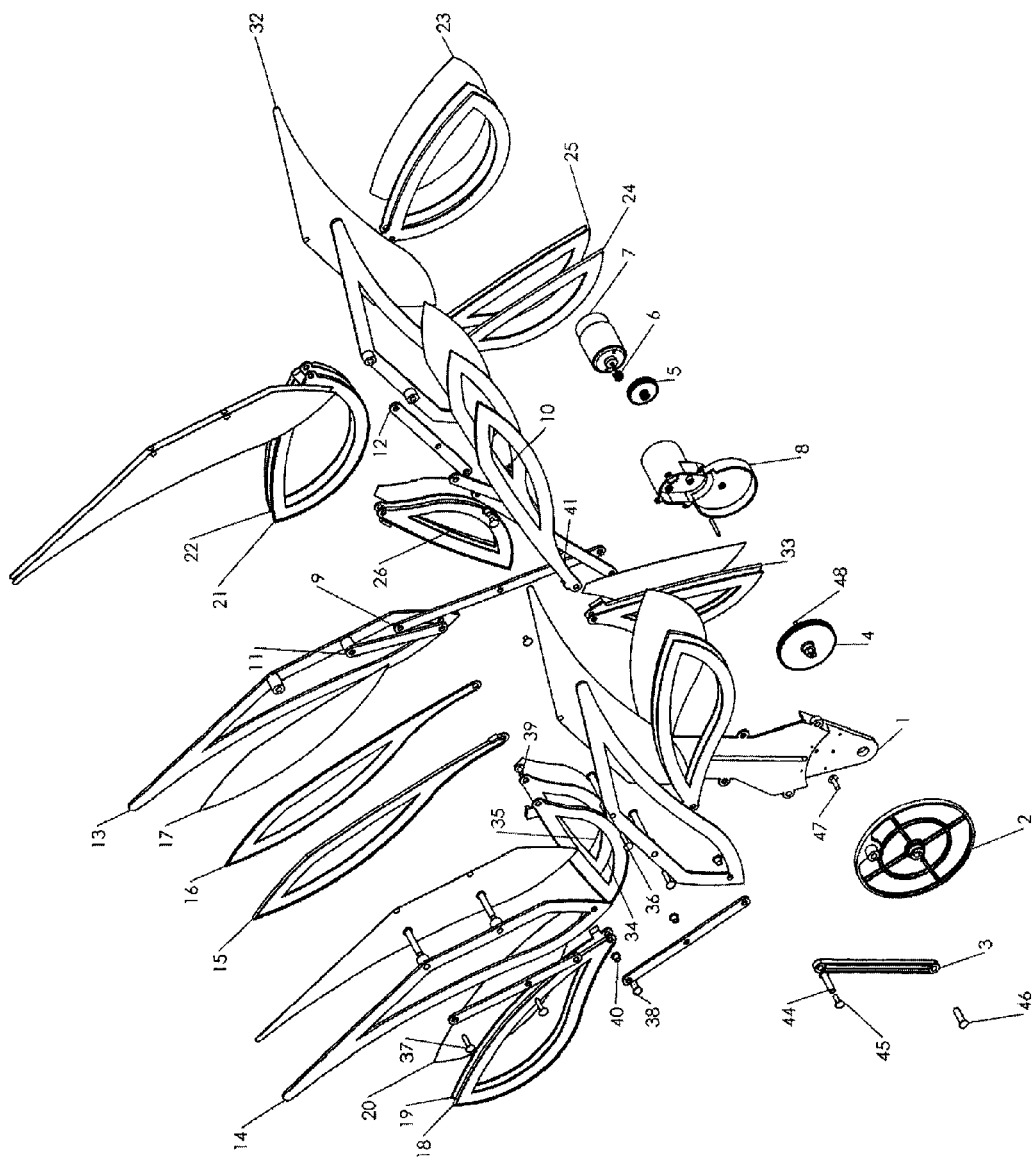
FIG. 4 shows an exploded view of the internal mechanical components, in accordance with an exemplary embodiment of the present invention.
Figure 5A:
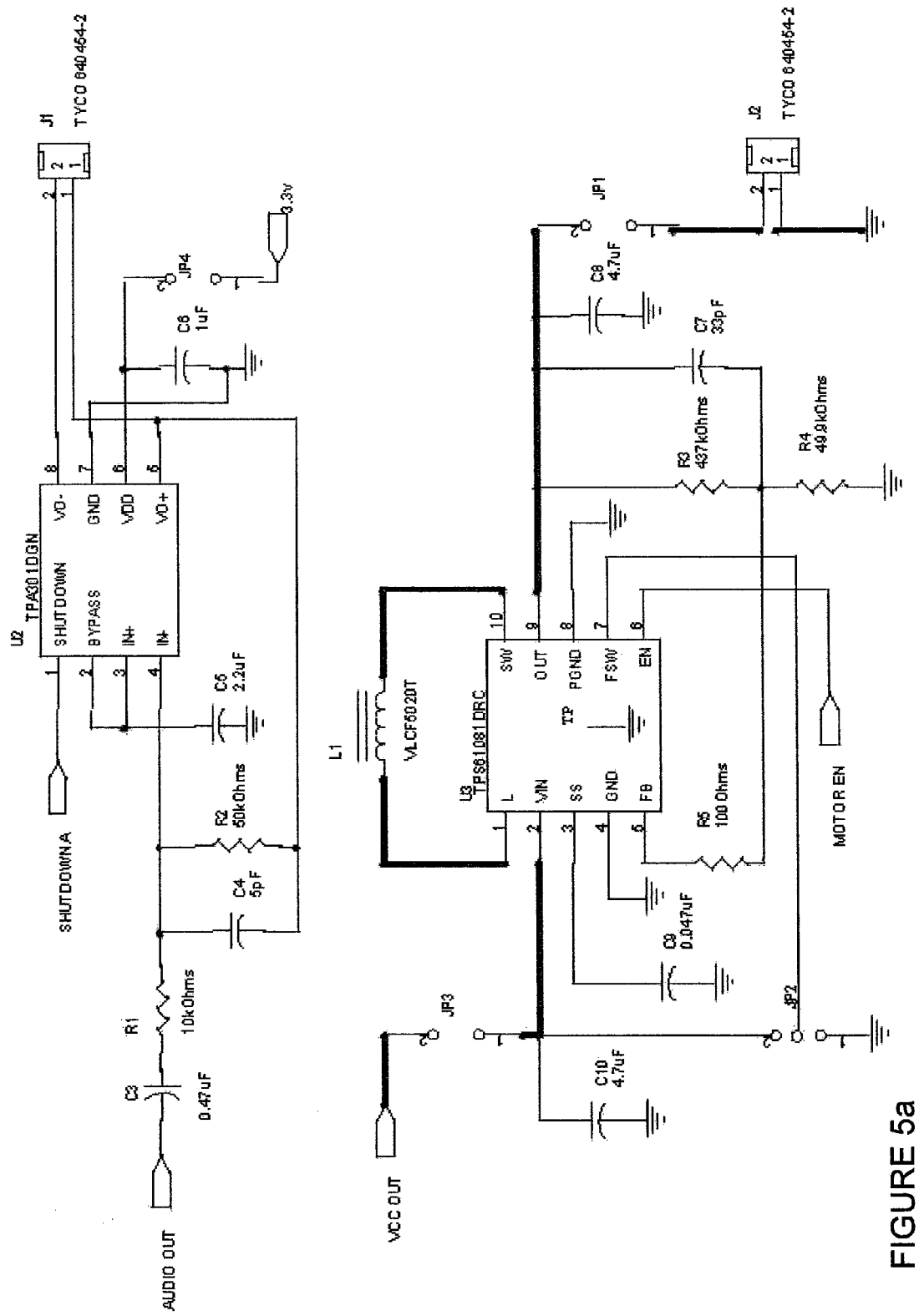
FIGS. 5a-5e show a circuit diagram of the interfaces of various components including the microcontroller, GPIO, Audio, RF Receiver, LED backlight and motors, in accordance with an exemplary embodiment of the present invention.
Figure 5B:
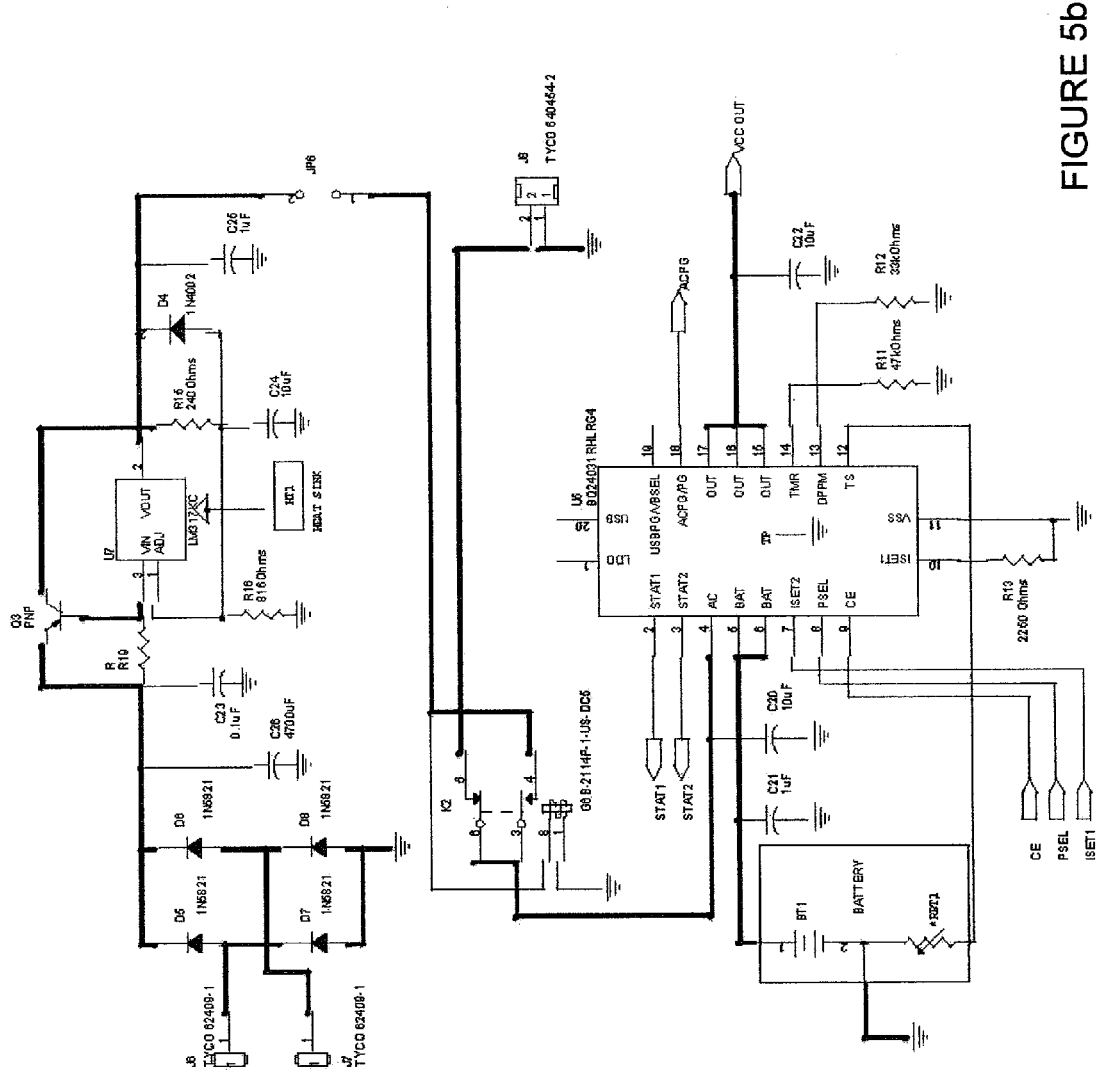
Figure 5C:
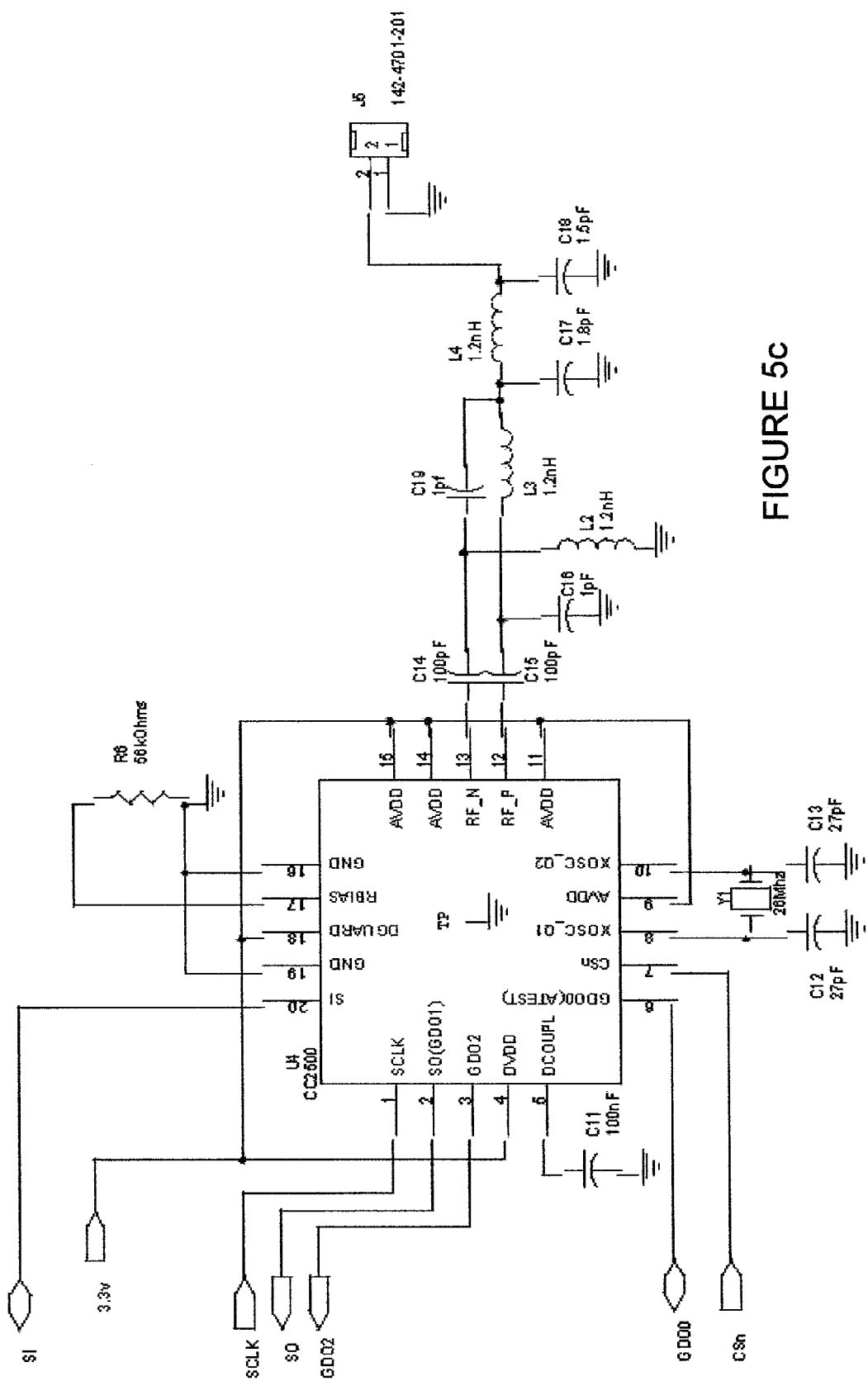
Figure 5D:
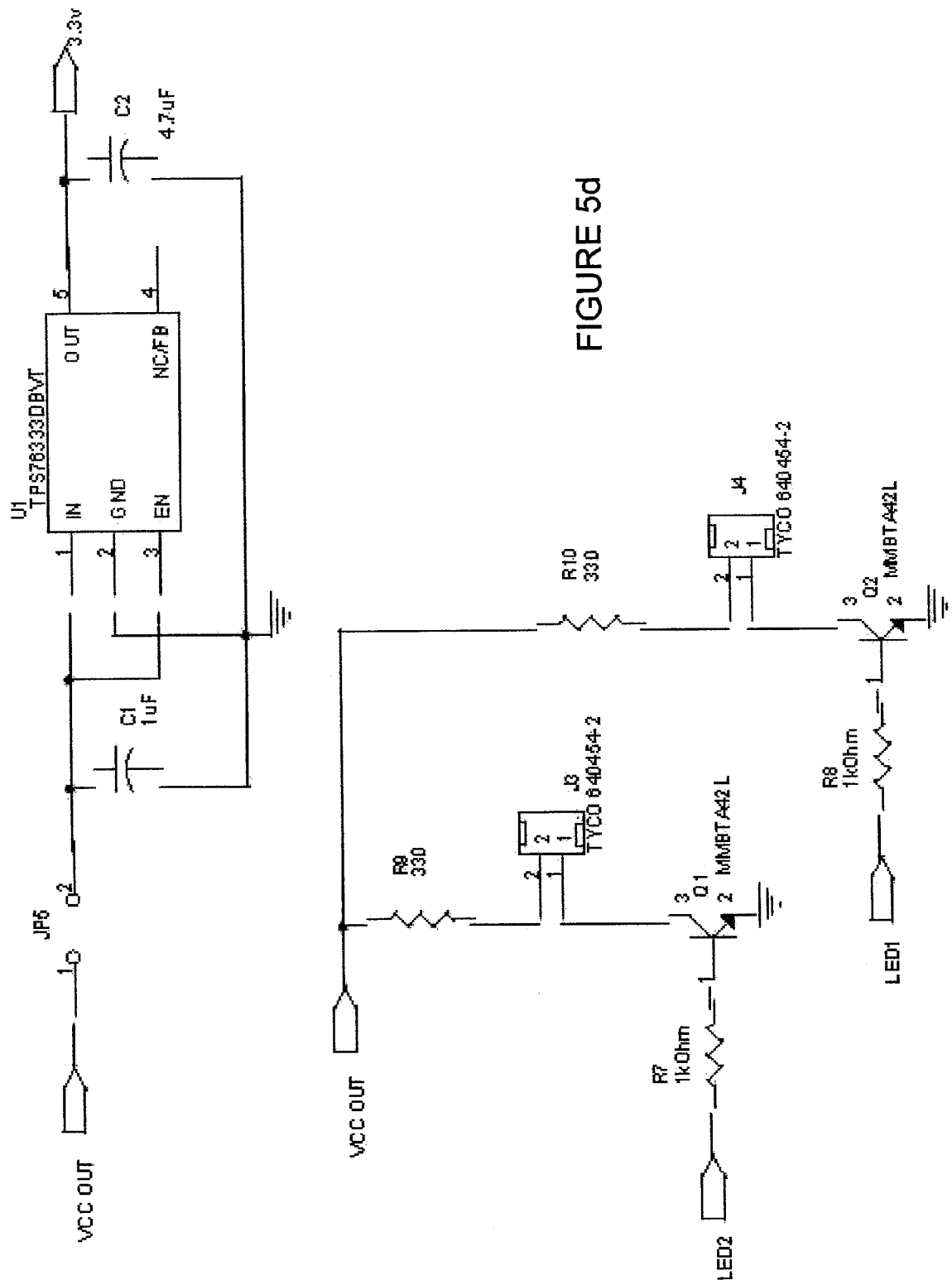
Figure 5E:
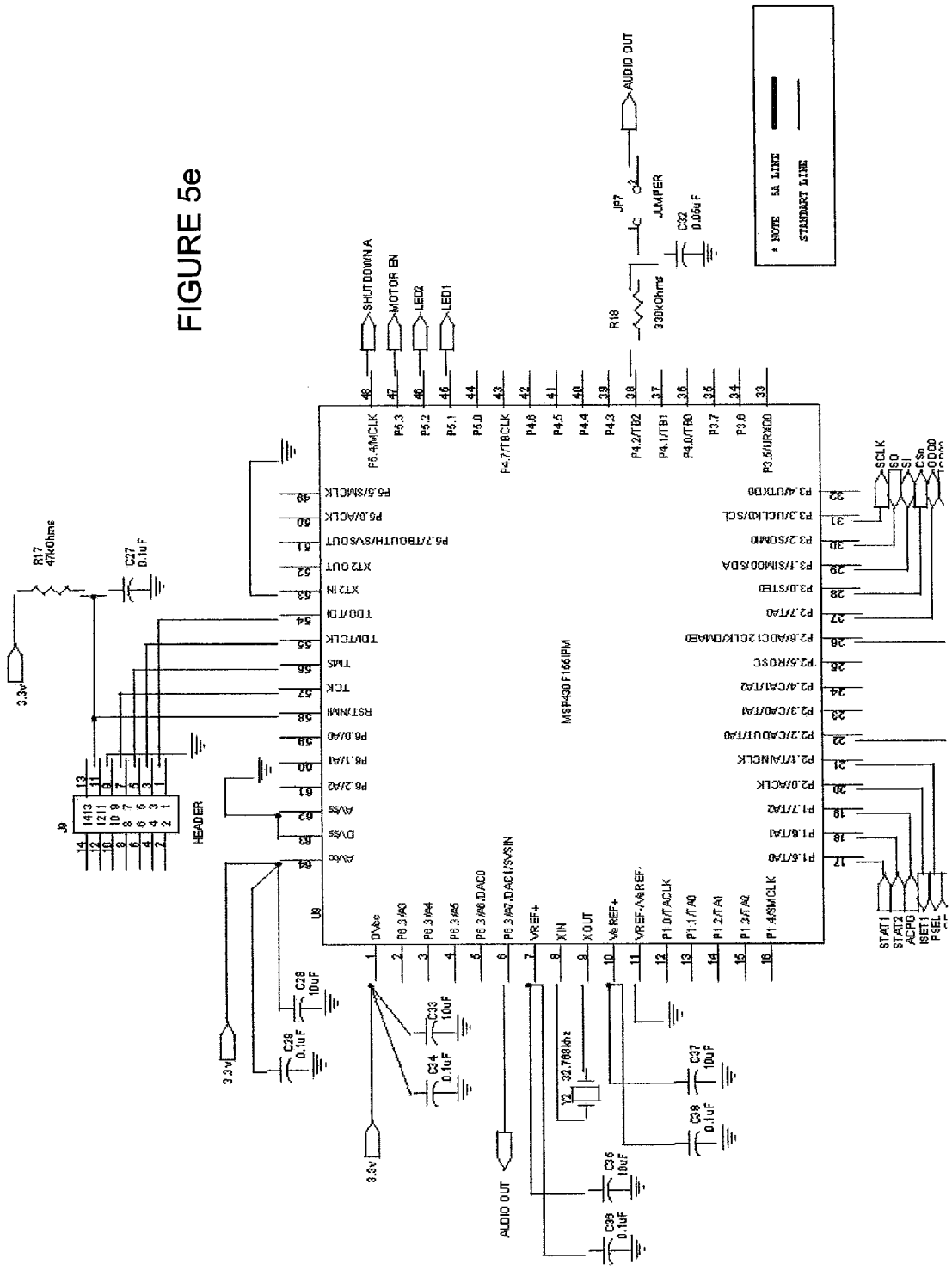

With respect to FIG. 4, the internal components, in an exemplary embodiment, include one or more of a base, different types of axis (e.g., five types of axis), switches, a shaft, a gear case, a 10 gear, an 80 gear, a 10-40 gear, a cap, and a motor. More specifically, with respect to FIGS. 3-4, exemplary components include Backbone 1, Cam 2, Connecting rode 3, Gear (80 Th) 4, Gear (40 Th) 5, Gear (10 th) 6, Motor 7, Motor base 8, Axis 9-12, Interior wing Male 13, Interior wing Female 14, Interior wing MALE 15, Interior wing FEMALE 16, Wing internal Mesh 17, Interior wing Male 18, Interior wing Female 19, Wing internal Mesh 20, Interior wing Male 21, Interior wing Female 22, Wing Internal Mesh 23, Interior wing Male 24, Interior wing Female 25, Wing internal Mesh 26, Front Hawk 27, Back Hawk 28, Beak 29, Claws 30, Wing 31, Wing internal Mesh 32, Interior wing Male 33, Interior wing Female 34, Wing internal Mesh 35, PINS 36-47, Gear axis 48, Speaker 49, and Battery 50.

Figure 6:
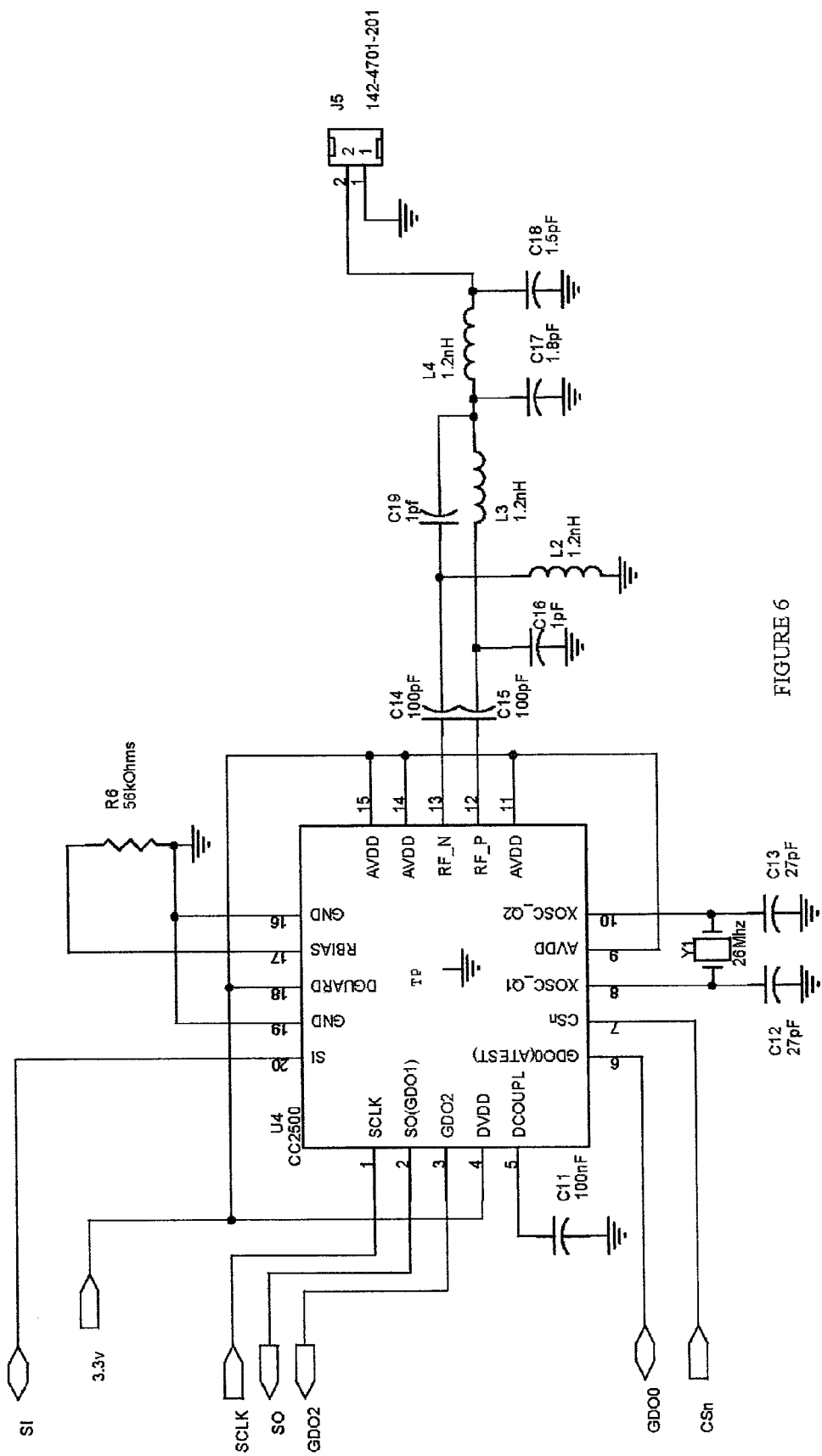
FIG. 6 shows a circuit diagram of the RF Transceiver, in accordance with an exemplary embodiment of the present invention.
Figure 7:
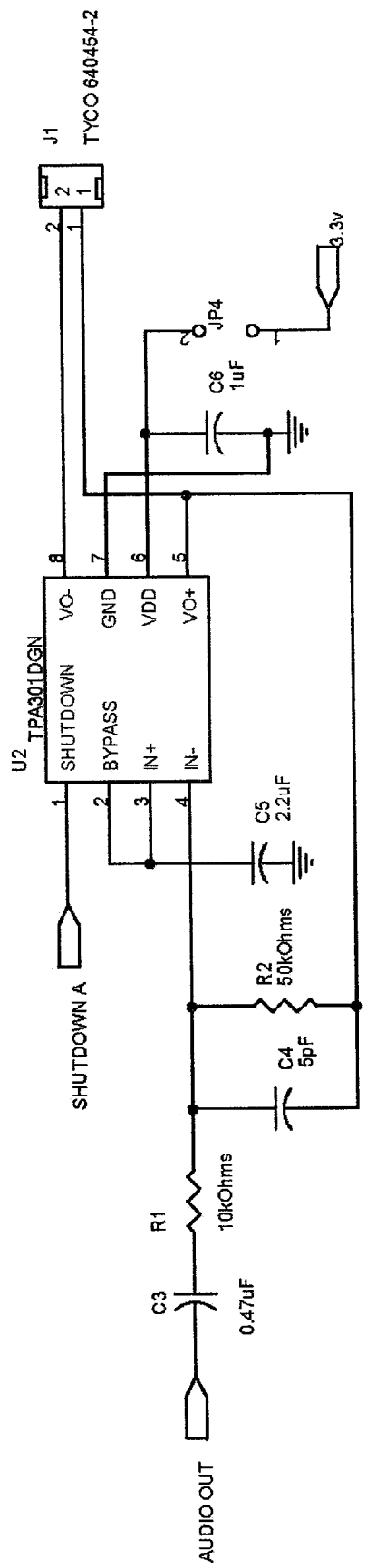
FIG. 7 shows a circuit diagram of the Speech P/R, in accordance with an exemplary embodiment of the present invention.
Figure 8:
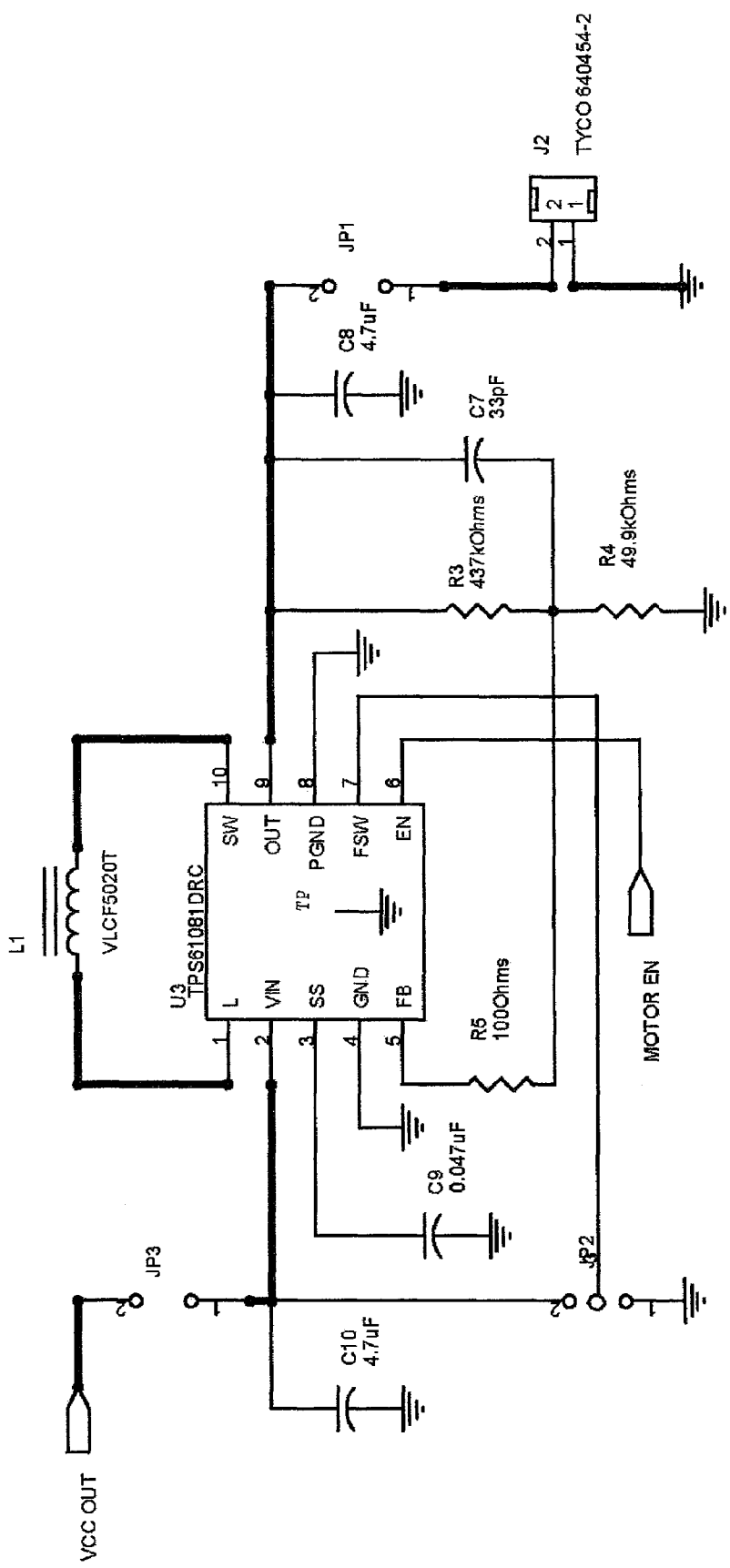
FIG. 8 shows a circuit diagram of the Motor LED control, in accordance with an exemplary embodiment of the present invention.
Figure 9:
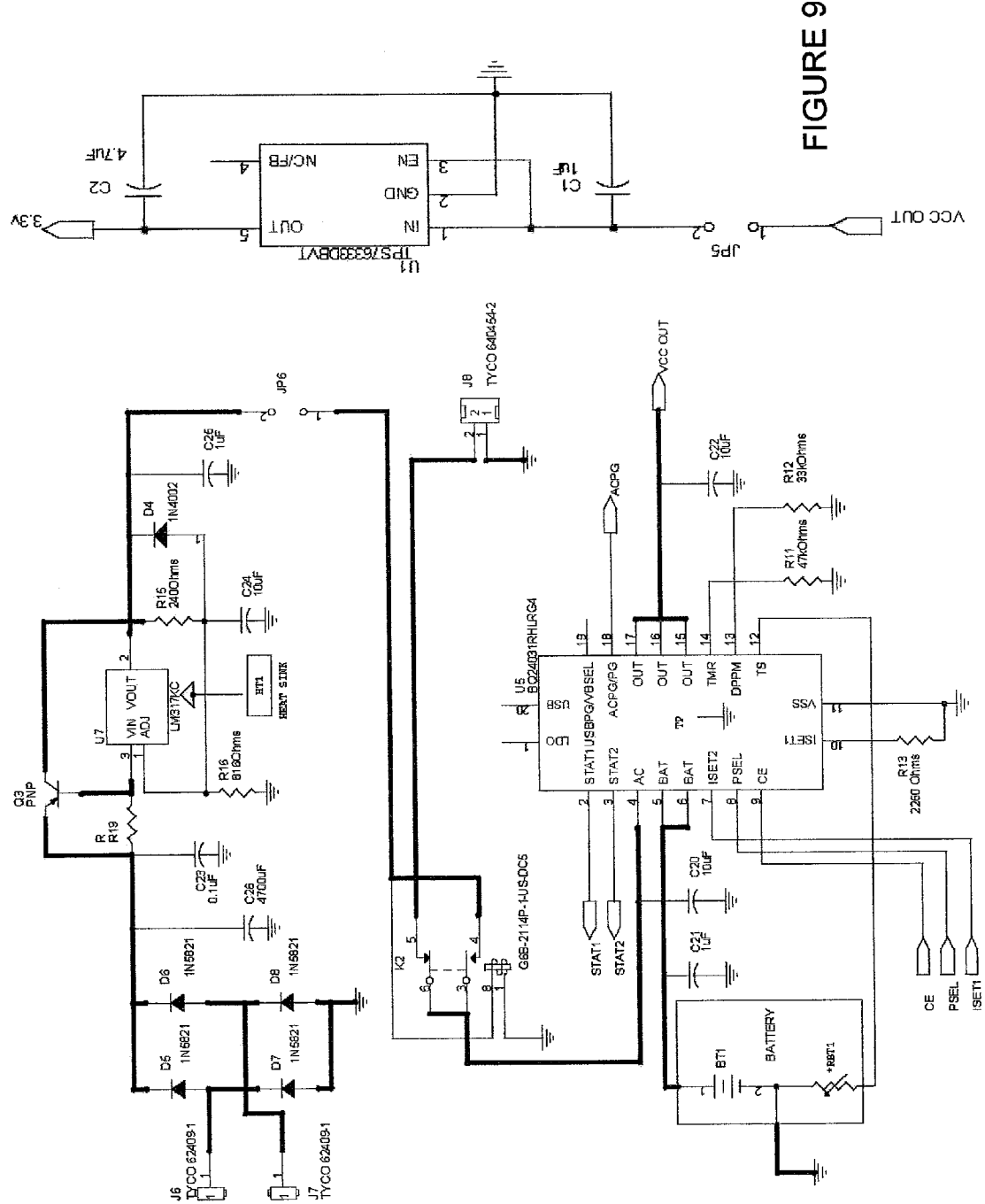
FIG. 9 shows a circuit diagram of the Power Supply, in accordance with an exemplary embodiment of the present invention.
Figure 10:
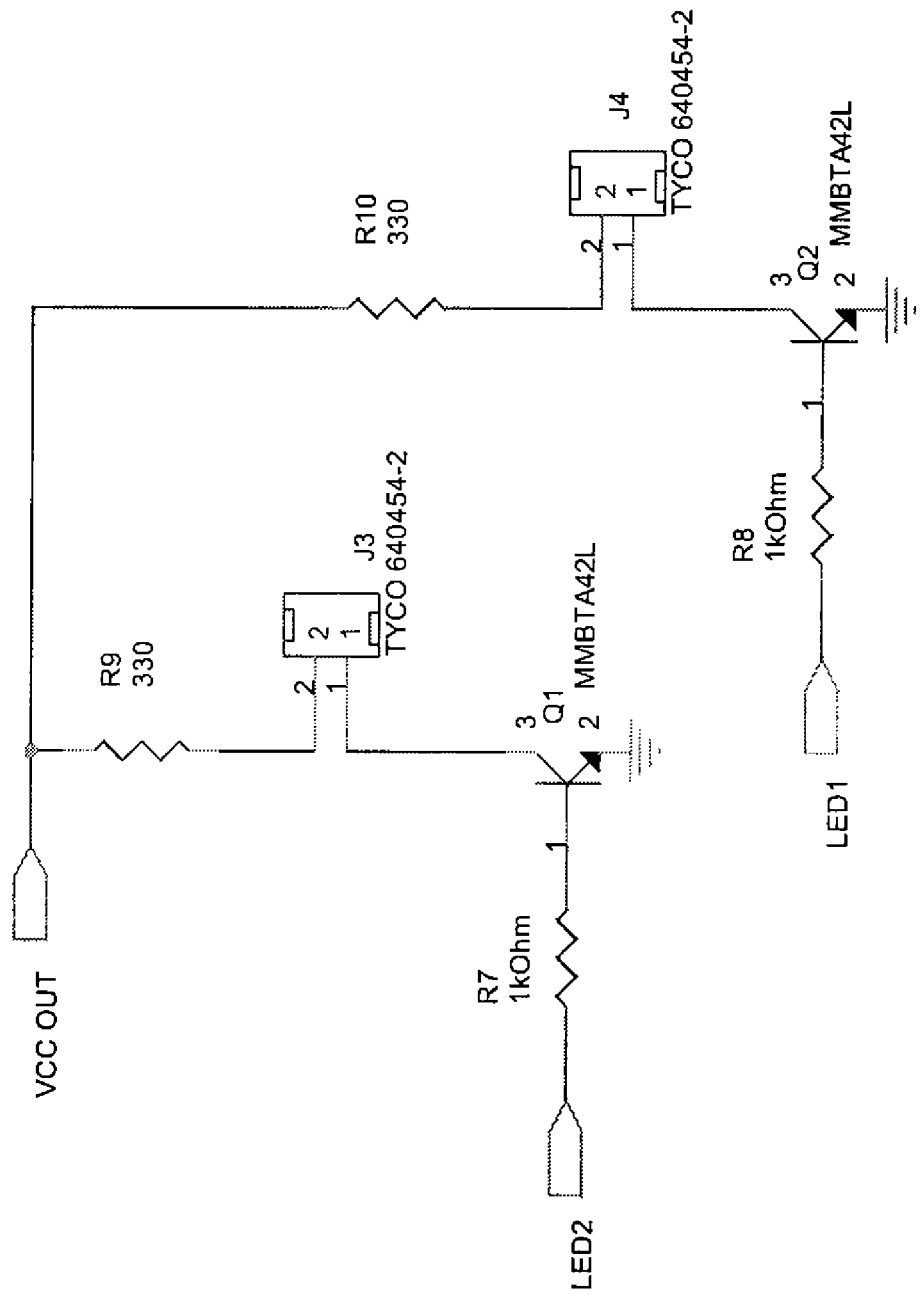
FIG. 10 shows a circuit diagram of the LED Backlight, in accordance with an exemplary embodiment of the present invention; and, FIG. 11 shows a circuit diagram of the microcontroller, in accordance with an exemplary embodiment of the present invention.
Figure 11:
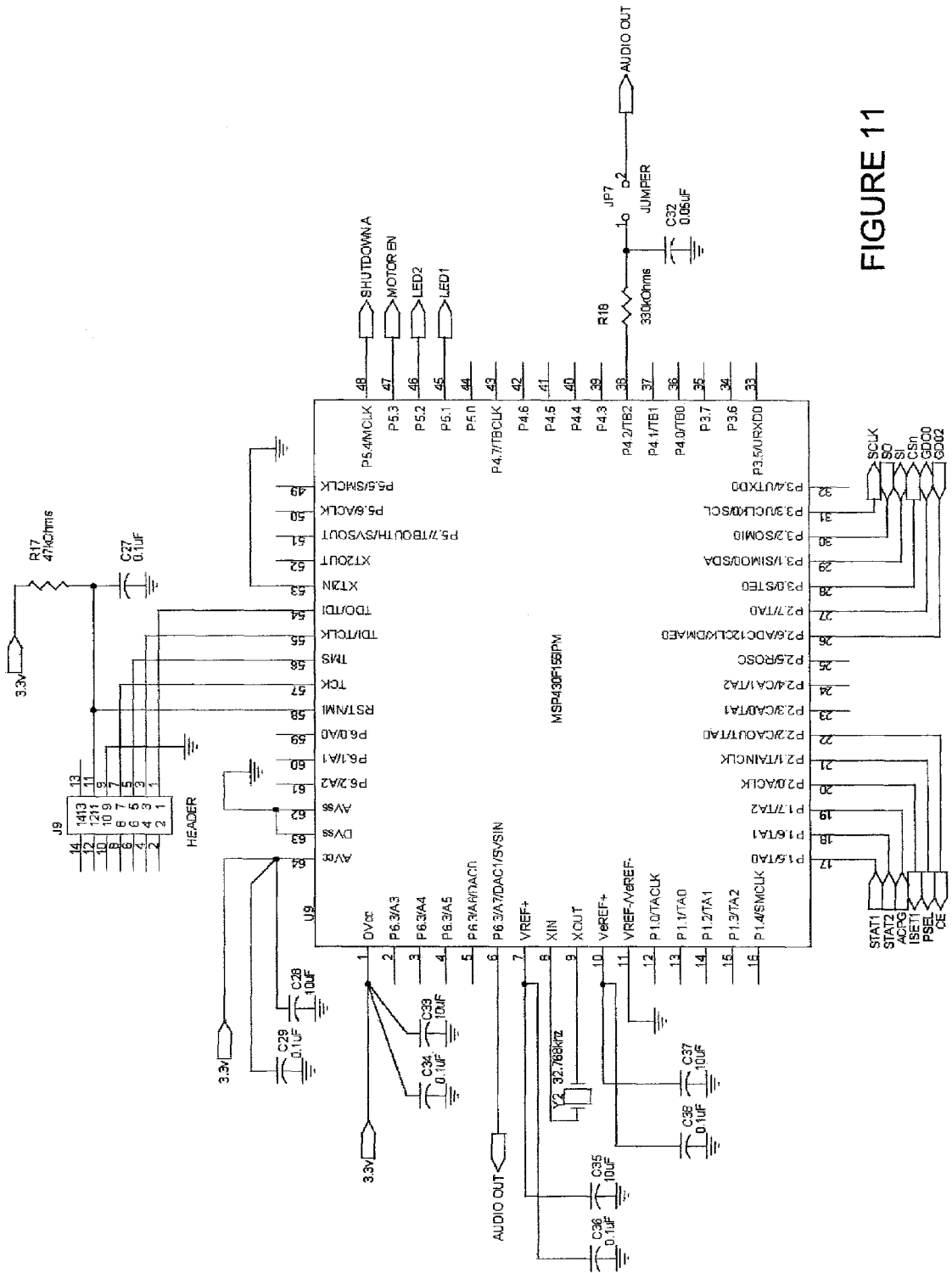

In one embodiment, switches are used to control power for the motor, motion detector, sound device, timer or other electronic devices. The control may include turning on or off the power or sound, changing the power, regulating the speed of the motor, controlling the timing and sensitivity of motion, adjusting the volume of sound and/or the like. Exemplary electronics for the system are shown in the various Figures. For example, FIG. 5 shows a circuit diagram of the interfaces of various components including the microcontroller, GPIO, Audio, RF Receiver, LED backlight and motors; FIG. 6 shows a circuit diagram of the RF Transceiver; FIG. 7 shows a circuit diagram of the Speech P/R; FIG. 8 shows a circuit diagram of the Motor LED control; FIG. 9 shows a circuit diagram of the Power Supply; FIG. 10 shows a circuit diagram of the LED Backlight; and, FIG. 11 shows a circuit diagram of the microcontroller.

The remote control may be operated by a user or by a computer. In one embodiment, with respect to FIG. 6, the remote control activates the device using the RF transceiver via infra-red or radio transmission, programs the device, programs the timer and/or the like.

With respect to FIG. 8, the motor is used to spin, turn, flap, and create movement for the wings, rotating plate, center spindle or any other mechanical parts. The motor is also used to spin or stream objects or disperse items from the invention. In one embodiment, the motor includes a RS-555PX/VX carbon-brush motor manufactured by Mabuchi Motor, which has an output of 5-90 Watts. The motor may be operated by a battery or any other power source discussed herein. In one embodiment, the motor is DC powered and may be powered by an AC to DC transformer. The motor may vary in rotation speed and the rotation speed may be controlled external to the invention. The motor may vary is size and may include varying input and output power.

With respect to FIG. 9, the power source (e.g., battery) for the motion detection circuit, in one embodiment, provides DC power to the Motion Detector or any other component, uses a 9V or 12V DC battery supply, includes an optional DC adapter (AC electrical power is converted to DC power via transformer) and/or the like. The shell may include a holding area on its front or back side (either top or bottom) for supporting or hiding the battery or adapter. Any of the power may also be produced by solar power, rechargeable battery, wind power and/or any other available battery source.

The Motion Sensors are an extension of the motion detection circuit that detects movement. The motion sensors comprise two circuits, namely transmit and receive circuits, which can be placed anywhere on or within the unit. The sensitivity of movement may be adjustable based upon various factors such as, for example, distance of the pest from the shell. The sensitivity control can be extended anywhere on the unit to be accessible from inside or outside the unit. The motion detection circuit comprises various types of components to convert movement into voltage or contact closure. The circuit may control other objects and circuits to provide or produce other outside features or functions. The sensitivity for the motion detection circuit is also adjustable.

In one embodiment, the Support Rod hole may provide support for the two halves of the shell, creates an axis for the center spindle to spin, flap or rotate, provides an adjustable gap between the divided halves, includes a mounting attachment (bolt, screw, latch, etc.) at the top and bottom, and/or creates a pathway for connectivity for the components in either or both of the split halves (or top and bottom portions).

The rotation plate (e.g., attached to the motor) may comprise attached streamers, wherein the streamers help to disperse pests from the area. Other types of streamers or objects may be attached to the rotation plate depending on the condition or pest. The rotation plate may also be configured to perform any other mechanical operation such as wing movement in a flapping or up/down motion. The rotation plate may be configured to disperse items from the invention such as, for example, water, pesticides, soft solids, various small shaped objects and/or any of the other items discussed herein.

The center spindle is a multi-purpose component. In one embodiment, the center spindle is attached to the Rotation Plate and gear box or gears to provide spinning of the Rotation Plate. The center spindle is hollowed out for the supporting rod to pass through, and it also creates a pathway for wires for connection and connectivity between the top half and bottom half of invention.

In one embodiment, the bottom plate is configured to support the motor. The gear box, gears, and wires may be attached to the bottom plate. The bottom plate may also attach to the center spindle to provide spinning of the streamer or other object to deter the pests.

In one embodiment, the gear or gear box is attached to the motor to turn the main center spindle. More specifically, the motor may attach, connect or be placed to provide spin, rotation, translation, or other movement (circular, up, down, etc) to the center spindle to allow the top plate to spin. The gear or gear box may vary in size, use different types of gears, may vary in quantity of gears, may be comprised of plastic, metal, wood or any other suitable composition, may be above or below the bottom plate. The gear or gear box may be attached to the center spindle by adhesive, or be molded to form one complete integrated unit. In one embodiment, the gear or gear box, center spindle, streamers and rotation plate are molded together to create one complete integrated center unit.

While the steps outlined above represent a specific embodiment of the invention, practitioners will appreciate that there are any number of mechanical components, electrical components, electronic components, computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

I claim:

1. A system for deterring an animal, which is a pest, from destroying property, said system comprising:
    a shell configured in the shape of a predator of said animal, said shell containing a motor, a motion detector and a DC power source, said shell configured to be mounted and stationary;
    eyes including lights within said shell;
    an audio speaker associated with said shell, said audio speaker configured to emit human generated sounds;
    moving parts attached to said shell, said moving parts configured to startle said animal;

said motor configured to move said moving parts and configured to communicate with a remote control and said motion detector;

said power source providing power to said motion detector, said lights in said eyes, said audio speaker and said motor;

said motion detector configured to detect said animal, and upon detection of said animal, said motion detector is configured to send a signal to said motor to activate said motor;

said remote control which is configured to at least one of: program a timer which sends a signal to said motor to activate said moving parts, and directly activate said moving parts;

a control module which is configured to receive an instruction signal which is created from input into an Internet webpage, wherein said instruction signal includes programming instructions for at least one of: said motor and said moving parts; and said control module further configured to send a notification to a third party, wherein said notification includes information regarding at least one of: moving parts and activation data.

2. The system of claim 1, wherein said moving parts include at least one of: flapping wings, swirling arms, flashing eyes, and streamers.

3. The system of claim 2, wherein said support rod is further configured to support two portions of said shell.

4. The system of claim 3, further comprising a switch configured to control power from said power source to said motor and said motion detector.

5. The system of claim 4, further comprising a timer in communication with said motor, wherein said timer is configured to activate at least one of: at a predetermined time, periodically, randomly, increasing time periods and decreasing time periods.

6. The system of claim 5, wherein said support rod includes a hole, wherein said hole is configured to at least one of: create an axis for said center spindle, and create a pathway for connectivity within said shell.

7. The system of claim 6, wherein said power source comprises at least one of: DC power, AC power, solar power, pressure power and battery power.

8. The system of claim 7, wherein said motion sensor further comprises at least one of a light sensor and environmental sensor.

9. The system of claim 8, further comprising a control module which is configured to receive an instruction signal with programming instructions for at least one of: said motor and said moving parts.

10. The system of claim 9, wherein said moving parts are configured to move in at least one of: up, down, back and forth, full circular, partial circular, side to side, random, increasing, decreasing, and periodic.

11. The system of claim 10, wherein said animal comprises at least one of a: pigeon, bird, snake, mice, bat, rabbit, rodent, and gopher.

12. The system of claim 11, further comprising a signal creator which is configured to create at least one of audio and video signals upon detection of said animal.

13. The system of claim 12, further comprising a signal creator which is configured, upon detection of said animal, to create at least one of: predator noises, popping noises, human noises, gunshot noises, lightening noises, display of holograms, display of a video on a nearby surface, laser light pointer, mist spray, pesticide spray, disperse pest poison, spray a stream of water and bubbles.

14. The system of claim 13, wherein said moving parts are attached to acenter spindle, and said center spindle is configured to interface with a support rod and a gear box.

\* \* \* \* \*